United States Patent [19]

Mwanyoha

[11] 4,325,109
[45] Apr. 13, 1982

[54] LAMP CONVERSION UNIT

[75] Inventor: Bakari Mwanyoha, New Bedford, Mass.

[73] Assignee: NU Industries, Inc., New Bedford, Mass.

[21] Appl. No.: 591,001

[22] Filed: Jun. 27, 1975

[51] Int. Cl.³ .......................................... F21V 19/00
[52] U.S. Cl. ................................................. 362/412
[58] Field of Search ..................................... 240/52.6

[56] References Cited

U.S. PATENT DOCUMENTS

| | | | |
|---|---|---|---|
| 1,562,052 | 11/1925 | Price | 240/52.6 |
| 1,605,778 | 11/1926 | Riley | 240/52.6 |
| 1,762,634 | 6/1930 | Jyumi | 240/52.6 |
| 1,944,040 | 1/1934 | Tam | 240/52.6 |
| 2,596,006 | 5/1952 | Bramming | 240/52.6 |
| 2,777,052 | 1/1957 | Combs | 240/52.6 |

*Primary Examiner*—Stephen J. Tomsky

[57] ABSTRACT

A unit for converting a bottle or similar receptacle having a neck into a lamp, said unit mounted around the outside of the bottle neck. The basic portion of the unit consists of an inverted cup whose inside diameter exceeds the outside diameter of the bottle neck. The cup carries at least three threaded engaging screws at its lower end. The lower end of a conventional lamp pipe carrying a lamp socket at its upper end, is threaded into the upper central portion of the inverted cup. A self-locking press-plate is threaded at the bottom end of the lamp pipe inside the cup so that the plate rests on top of the bottle neck. At the lower end of the cup, screws engage the bottom end of a shoulder on the bottle neck such that as the lamp pipe is threaded into the cup, the cup and the engaging screws are pulled upwardly thus a compressive force is developed between the shoulder and the top of bottle neck which force holds the unit firmly onto the bottle to complete a lamp. The radially movable screws and axially movable press-plate make a suitable arrangement for accommodating various bottle neck sizes in lengths and outside diameter.

3 Claims, 9 Drawing Figures

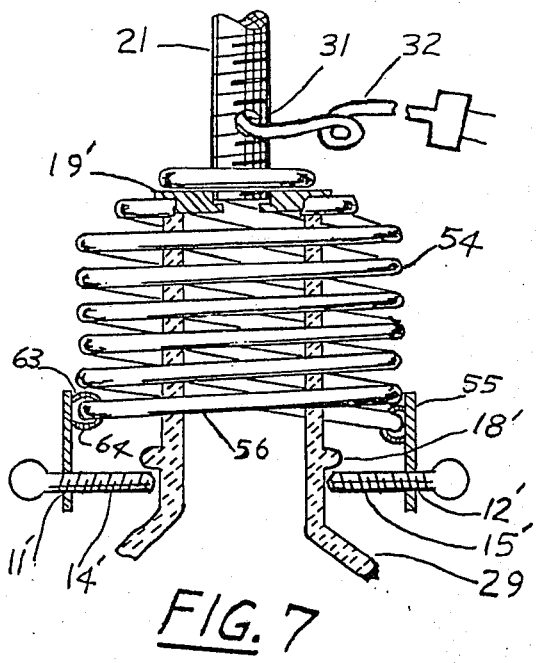
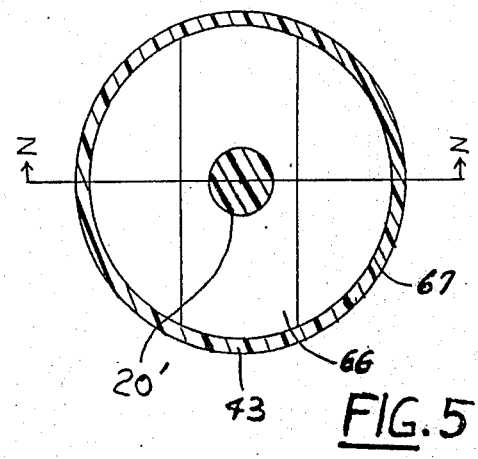
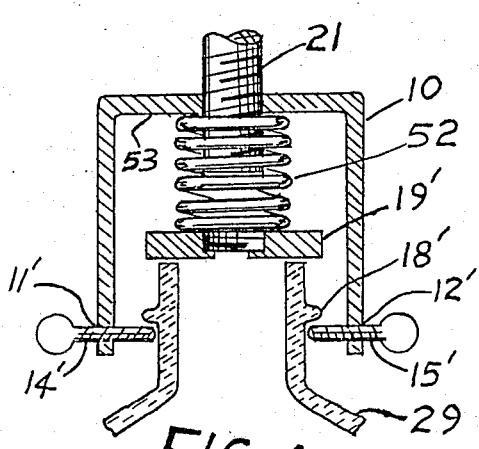
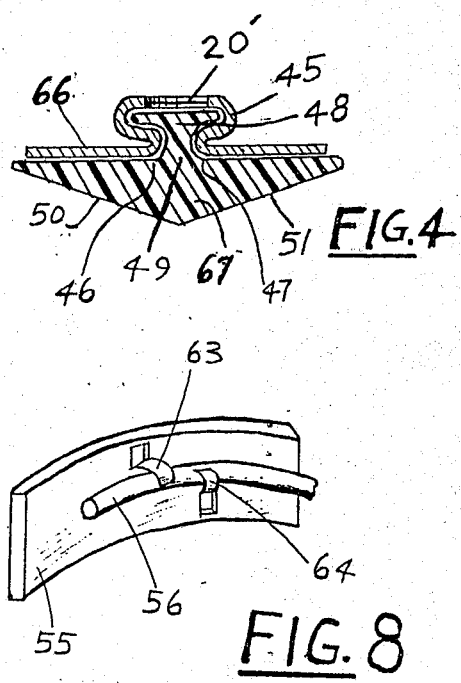

LAMP CONVERSION UNIT

BACKGROUND OF THE INVENTION

Various methods are used for manufacture of conventional table lamps. This invention relates to a preassembled lamp conversion unit which is attachable to the body of a standard to form a table lamp. In the existing art the lamp conversion unit consists of a short pipe on which a lamp socket is mounted on the upper end of the pipe. A cork is squeezed into the neck of the standard and the lower end of the pipe is mounted in the cork by piercing or by first cutting a hole in the cork. Cork is difficult to work with and generally a tool is needed in order to accomplish the objective by trial and error. To overcome this disadvantage, the pipe is first fitted into a molded resilient material which material is then squeezed into the neck of the standard. It will be clear to those familiar with the art that the conversion unit which is fitted inside the neck of the standard and secured by either a cork or resilient material, has a major disadvantage in that the force which secures the lamp socket and the pipe to the standard is inadequate for enabling the use of a harp for carrying large decorative lamp shades. And, therefore, lamps made in accordance with prior art have short pipe pieces and are limited to receiving relatively small lamp shades which are mounted on electric bulbs. Another disadvantage is that there must be a hole on the standard in order to mount the existing conversion unit. Moreover, at certain conditions the squeezed cork and resilient material are subject to gradual slippage due to loss of sufficient friction force necessary for gripping on the standard.

SUMMARY OF THE INVENTION

The present invention replaces the cork or molded resilient material with attaching means which secure the conversion unit on the outside of the standard. A conventional threaded pipe carries a lamp socket at the top and then it is threaded into an inverted cup whose inside diameter exceeds the outside diameter of the standard. At the lower end of the inverted cup are engaging screws which move radially inward and outward with respect to the cup in order to engage the bottom of the lowest shoulder of standard-necks of various sizes and shapes. At the lower end of said pipe is affixed a self-locking press-plate which is larger horizontally than the outside diameter of the said neck. Said plate rests against the top of said neck such that as the pipe is turned to move axially and downward into the cup, the said cup and said screws are pulled upward while the said plate is pushed in opposite direction downward whereupon a compressive force is applied between the said shoulder and top of the said standard. The axial movement of the pipe with respect to the cup provides means for accommodating various heights of the neck on the standard. This invention allows the use of long lamp pipes and large decorative shades.

An object of this invention is a provision of a lamp conversion unit which is secured firmly to a standard in order to enable the lamp to carry a harp and associated large decorative shade.

An object of this invention is a provision of a lamp conversion unit which is secured onto and around the outside of the neck of a standard.

An object of this invention is a provision of a lamp conversion unit which can be mounted on standards of different neck sizes both in length and outside diameter.

An object of this invention is a provision of a lamp conversion unit which is secured on a standard by compressive force applied between the lowest shoulder and top of the neck of the standard.

An object of this invention is a provision of a lamp conversion unit which is made from conventional and economically available parts and materials.

An object of this invention is a provision of a lamp conversion unit which can be used for mounting on standards of different neck shapes such as round, triangular, square and rectangular.

The above stated and other objects and advantages of this invention will become apparent from the following description when taken with accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

FIG. 2b is a view similar to FIG. 2a, but illustrating another form of a lamp conversion unit utilizing a modified press-plate and a flat spring assembly, said spring replacing the engaging screws in FIGS. 1 and 2a.

FIG. 4 is a detailed cross-sectional view of the press-plate in FIG. 2b.

FIG. 5 is a top view of FIG. 4.

FIG. 6 is a cross-sectional view similar to FIG. 2b showing another form of the invention, wherein a compression spring is disposed inside the inverted cup to provide the engagement force between the press-plate and the screws.

FIG. 7 is a cross-sectional view similar to FIG. 6 showing yet another form of the invention wherein an extension spring replaces the inverted cup and the said spring also providing the required engagement force.

FIG. 8 is a perspective view showing a ring carrying the screws in FIG. 7, and how the said ring secures and supports the lower end of the extension spring.

DESCRIPTION OF PREFERRED EMBODIMENT

It should be noted that the word Standard refered to herein means a bottle, jar, jug, vase and like articles, each of which generally has a shoulder on the outside near the mouth or near the bottom of its neck whether said neck is threaded to receive threaded closure or unthreaded and, therefore, receives a cork-stopper inside the mouth.

Figure 1:
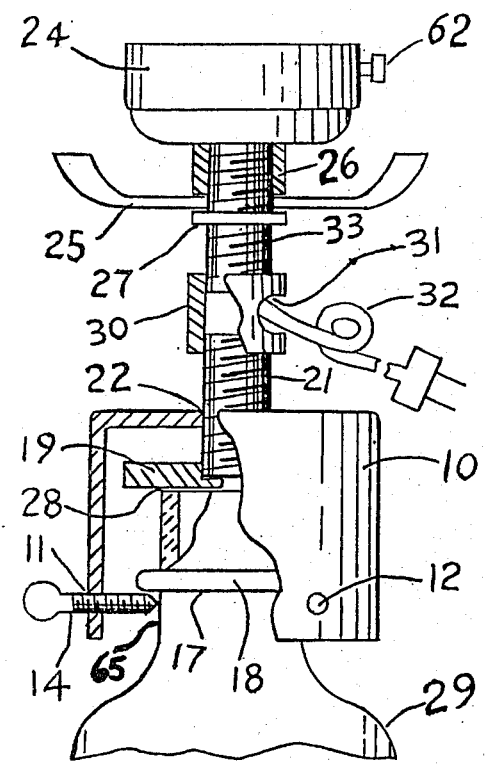
FIG. 1 is a front elevation view of an assembled Lamp Conversion Unit with parts broken away to show the inner structure of one form of the invention.
Figure 2A:
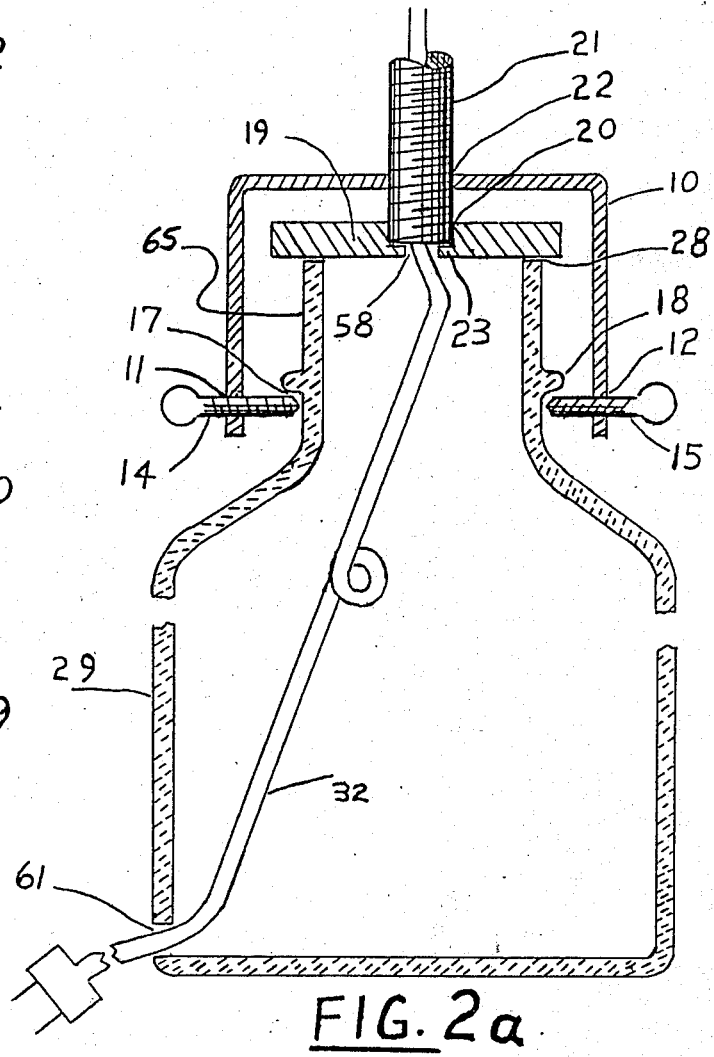
FIG. 2a is a cross-sectional view of a preferred embodiment of the invention showing how the inverted cup, engaging screws, press-plate and lamp pipe are assembled and secured to the standard.

Referring now to FIGS. 1 and 2a, inverted cup 10 has threaded holes 11, 12, 13 carrying, at least three, engaging thumb screws 14, 15, 16 which screws engage the bottom end 17 of the standard neck shoulder 18 the top of which neck 65 lies against a self-locking press-plate 19. The upper side of the press-plate 19 has female threads 20 which threads receive the bottom end of threaded Lamp pipe 21. The lamp pipe, however, does not go through the self-locking press-plate 19 due to the presence of an obstruction 23 formed by the presence of the small and unthreaded hole 58 at the bottom of said press-plate 19. The self-locking plate is for eliminating a lock nut during assembly. The upper end of the pipe 21 is connected to the second pipe 33 by means of a pipe coupling 30 which coupling has a hole 31 through which an electric cord passes to supply electricity to said lamp socket 24. The lamp pipe also goes through another female threaded hole 21 on the upper side of the inverted cup 10. The upper end of said lamp pipe 33 is threaded into a conventional type lamp socket 24 with conventional switch 62. A conventional harp base 25 is held against the bottom 26 of lamp socket 24 by lock nut 27. When the pipe 21, coupling 30, pipe 33 and socket 24 in combination are turned and threaded into non-rotating cup 10 the pipe 21, moves axially downward and against the press-plate 19 which in turn presses against the top of the neck of the standard at 28 while at the same time the pipe downward movement causes an opposite upward movement of the cup 10 and in so doing the engaging thumb screws 14, 15, 16 are pushed axially upward while engaging the shoulder 18, thus a compressive force is applied between the shoulder 18 and the press-plate 19. This compressive force which is directly proportional to the torque applied on the pipe 21 engages the standard 29 and the lamp socket 24 thus accomplishing the conversion of a standard and the conversion unit into a complete lamp. It will be noted that insertion of a shade harp into harp base 25 would permit the use of any size of conventional lamp shades as desired because this novel device provides a strong engagement force between the standard and the lamp conversion unit.

It will be noted that the three engaging thumb screws would hold onto circular and triangular shaped standards, whereas four engaging screws would hold onto square and rectangular shaped standards. The neck of the standard does not have to have a mouth.

It will also be noted that a coupling 30 has a hole 31 through which a lamp cord passes. The coupling also serves a second purpose of joining two lamp pipes 21 and 33. Moreover, the unthreaded opening 58 at the bottom of the press-plate 19 is intended for allowing lamp chord 32 to pass through, and which cord also passes through a hole "61" at the bottom of the standard as shown in FIG. 2a.

Figure 3:
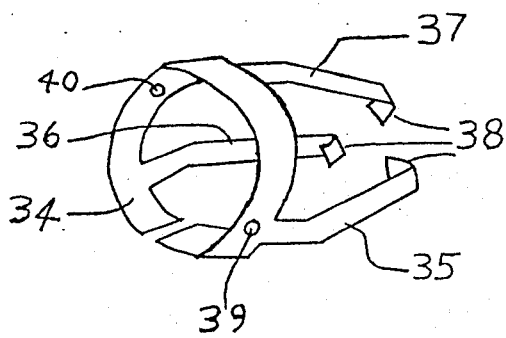
FIG. 3 is a perspective view of the flat spring shown in FIG. 2b.
Figure 2B:
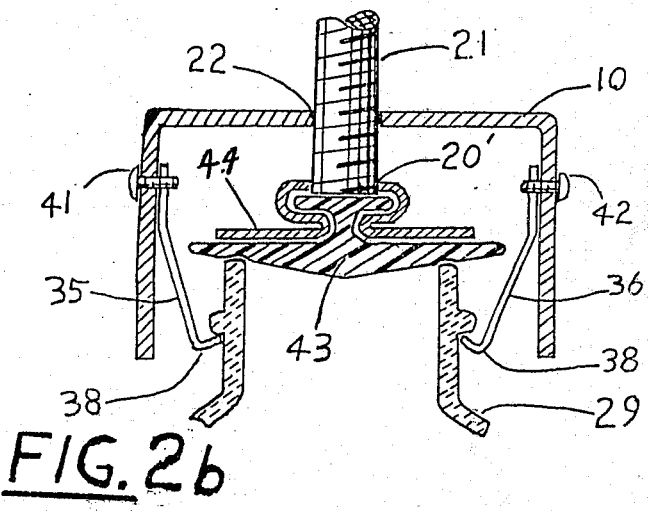

Referring now to FIGS. 3 and 2b it will be seen that a modified form of the invention is provided by a flat spring assembly 34 formed from one piece has at least three legs 35, 36, 37 each having an engaging hook 38.

The flat-spring assembly having threaded holes 39, and 40, is mounted and secured inside the inverted cup 10 by means of lock screws 41 and 42. This enables the flat-spring legs 35, 36, 37, and hooks 38 in FIG. 2b to replace and substitute the said engaging screws shown in FIG. 1 and FIG. 2a, such that the said hooks 38 engage the bottom of the shoulder 18 on the neck of the standard 29. It will be noted that the flat spring legs and hooks can easily snap down to engage the shoulder 18 after which time the lamp pipe 21 is threaded axially into the cup 10 to develop the compressive force on the neck between engaging hook 38 and press-plate 44 having resilient disc 43.

FIGS. 4 and 5 is another embodiment of the invention showing a different method of forming a self-locking press-plate which press-plate is shown on FIG. 2b and said press plate receives a resilient disc 43 for the purpose of providing water-tight seal at the mouth of the standard. The press-plate in FIG. 4 is formed from one piece, preferably metal, having a circular off-set portion 66 which is further offset on top to form channel-like portion 45 leaving a gap between round edges 46 and 47. The resilient disc 43 is formed so that it has an upper wing 48, a neck 49, and lower generally circular sealing body 67 which is tapered at the bottom as shown at edges 50 and 51. The resilient disc 43 is slidably fitted into gap 49 of the channel portion on the press-plate. The plate has threaded hole 20' to receive lamp pipe 21 which pipe upon threading is locked at the top wing 48 of the disc 43 against the lower offset portion of the plate. Since the resilient disc has a tapered bottom, when the combined plate and disc assembly is used as a press-plate for the conversion unit, the aforementioned compressive force deforms the resilient disc some what against the mouth of the standard, thus providing a watertight seal at the mouth of the standard.

Another embodiment of the invention is referenced in FIG. 6 wherein the engaging compressive force between aforementioned screws and plate is provided by a compression spring 52 whose inside diameter exceeds that of the lamp pipe 21 which spring is located inside the cup between the press-plate and the upper inside wall 53 of said inverted cup said pipe 21 located at a distance from the said press-plate 19' in order to allow the compression of the spring 52. In this application the required the engaging compressive force is obtained by first pressing the entire cup downward while engaging thumb screws are radially withdrawn so that after the screws reach the bottom of the shoulder 18' said screws are driven radially inward to engage said shoulder 18'.

FIG. 7 demonstrates yet another embodiment of the invention where the required engaging compressive force is applied by the use of an extension spring 54 which spring also replaces the inverted cup. The extension spring 54 has a smaller diameter at the top, just wide enough to receive the lamp pipe 21 but siad diameter is relatively smaller than that of the plate 19', and also said spring has a large diameter at the lower end to receive various sizes of standards. Attached at the lower end of the extension spring 54, is a ring 55 which carries engaging thumb screws 13', 14', 15' as shown in FIG. 7. FIG. 8 shows one method whereby the lower end 56 of spring 54 is held to ring 55, by a short curved sections 63, 64 stamped out of or molded from the same ring 55. In this application the extension spring 54 is pulled downward while the press-plate 19' engages the top of the standard and the engaging thumb screws have been axially withdrawn until said screws engage the bottom 17' of lower shoulder 18' on the outside of the neck of the standard after which time the said screws are then threaded radially inward to ensure engagement with the shoulder 18'.

It will also be noted that in this invention the press-plate is needed for attaching a lamp conversion unit to standards with open mouths. In general, the press-plate can be excluded from the conversion unit wherever the standard already has a rigid cover on which a pressure can be applied by said lamp pipe.

Conversion units made by prior art cannot be transferred from one standard to one with a wider mouth because the squeezed cork or resilient material loses strength gradually upon use. The Conversion Unit made in accordance with the present invention, however, is supported by a new and novel mthod and it can be transferred from a standard with a narrower and shorter mouth to one with a wider and longer mouth, and vice versa.

Having now described the invention, what I desire to protect by Letters Patent is set forth in the following claims:

1. A lamp conversion unit for converting a standard such as a bottle or a vase into a lamp, said standard having a neck with a spaced shoulder, and said lamp conversion unit mounted on the outside of said neck of the standard, said lamp conversion unit comprising,
   (a) a lamp socket;
   (b) a threaded lamp pipe for supporting said lamp socket at the upper end of said lamp pipe;
   (c) a harp base mounted below said lamp socket and said harp base being secured against said lamp socket by a retaining nut;
   (d) an inverted cup over said neck of the standard, said cup having a threaded opening in the center of its upper base portion for receiving the lower end portion of said supporting lamp pipe, said cup having at least three threaded openings at its bottom portion, said threaded openings being equidistant from each other around the circumference of said cup, and said threaded openings receiving engaging screws for engagement on the bottom of said spaced shoulder on the neck of the standard for preventing removal of said inverted cup from said neck of the standard;
   (e) a press-plate having a threaded opening in its central portion for receiving the lower end portion of said supporting lamp pipe and said press-plate having a smaller unthreaded opening of a smaller diameter below said threaded opening, said smaller opening providing a locking position between said supporting lamp pipe and said threaded opening on the press-plate said press-plate resting on top of said neck of the standard, whereby said press-plate applying a downward engagement force against the top of said neck, said engagement force provided by relative rotation between said supporting lamp pipe and said inverted cup thus driving said supporting lamp pipe axially downward and said relative rotation simultaneously forcing said engaging screws upward, said screws applying engagement force against the bottom of said spaced shoulder on the neck of the standard, said engagement force between said press-plate and said engaging screws increasing as said supporting lamp pipe is driven further downward through the base of said inverted cup for providing the required engagement force between said inverted cup and the standard.

2. Invention as recited in claim 1 wherein the press-plate is substantially wider than the outside diameter of said neck of the standard, and the inside diameter of said inverted cup is substantially greater than the outside diameter of said neck, and said engaging screws on the bottom portion of the inverted cup being radially adjustable for receiving various neck widths of the standard.

3. Invention as recited in claim 1 wherein said supporting lamp pipe consists of two separate threaded lamp pipes connected by a coupling, said coupling having an opening on its side for passing through an electric cord into said lamp socket.

* * * * *